United States Patent
Kalepu

(10) Patent No.: US 9,235,843 B2
(45) Date of Patent: Jan. 12, 2016

(54) INSERTION OF USER INFORMATION INTO HEADERS TO ENABLE TARGETED RESPONSES

(75) Inventor: Kalyan Kalepu, Sammamish, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 669 days.

(21) Appl. No.: 12/891,685

(22) Filed: Sep. 27, 2010

(65) Prior Publication Data
US 2012/0079135 A1    Mar. 29, 2012

(51) Int. Cl.
| | | |
|---|---|---|
| G06Q 30/02 | (2012.01) | |
| H04W 4/20 | (2009.01) | |
| H04L 29/08 | (2006.01) | |
| H04W 4/02 | (2009.01) | |

(52) U.S. Cl.
CPC ........... G06Q 30/02 (2013.01); H04L 67/18 (2013.01); H04L 67/2804 (2013.01); H04W 4/206 (2013.01); H04W 4/025 (2013.01)

(58) Field of Classification Search
None
See application file for complete search history.

(56) References Cited

U.S. PATENT DOCUMENTS

| | | | |
|---|---|---|---|
| 6,332,127 B1 | 12/2001 | Bandera et al. | |
| 6,487,538 B1 | 11/2002 | Gupta et al. | |
| 6,741,853 B1 * | 5/2004 | Jiang et al. | 455/418 |
| 6,798,358 B2 | 9/2004 | Joyce et al. | |
| 6,823,260 B1 * | 11/2004 | Turcotte | 701/484 |
| 7,027,800 B2 * | 4/2006 | Haumont et al. | 705/14.64 |
| 7,146,505 B1 * | 12/2006 | Harada et al. | 713/185 |
| 7,162,221 B2 | 1/2007 | Spitz et al. | |
| 7,162,253 B2 * | 1/2007 | Vare et al. | 455/456.2 |
| 7,231,357 B1 | 6/2007 | Shanman et al. | |
| 7,337,456 B1 | 2/2008 | Nihei | |
| 7,412,234 B2 | 8/2008 | Zellner | |
| 7,436,804 B2 * | 10/2008 | O'Neill | 370/331 |
| 7,532,900 B2 | 5/2009 | Wilson et al. | |
| 7,574,523 B2 * | 8/2009 | Traversat et al. | 709/238 |
| 7,590,741 B2 * | 9/2009 | Sumino et al. | 709/227 |
| 7,599,795 B1 | 10/2009 | Blumberg et al. | |
| 7,602,277 B1 * | 10/2009 | Daly et al. | 340/438 |
| 7,995,997 B2 * | 8/2011 | Vare et al. | 455/414.2 |
| 7,996,521 B2 * | 8/2011 | Chamberlain et al. | 709/224 |
| 8,160,614 B2 * | 4/2012 | Shaffer et al. | 455/456.3 |
| 2001/0010685 A1 | 8/2001 | Aho | |
| 2002/0059226 A1 * | 5/2002 | Cooper | 707/6 |
| 2002/0132575 A1 | 9/2002 | Kesling et al. | |
| 2002/0133627 A1 * | 9/2002 | Maes et al. | 709/246 |
| 2003/0050964 A1 * | 3/2003 | Debaty et al. | 709/203 |
| 2003/0099197 A1 * | 5/2003 | Yokota et al. | 370/230 |
| 2004/0030788 A1 * | 2/2004 | Cimo et al. | 709/229 |
| 2004/0083131 A1 | 4/2004 | Kaufman et al. | |

(Continued)

FOREIGN PATENT DOCUMENTS

KR    1020090064487 A    6/2009

OTHER PUBLICATIONS

PCT Search Report and Written Opinion mailed Apr. 25, 2012 for PCT Application No. PCT/US11/52020, 9 pages.

*Primary Examiner* — Dung B Huynh
(74) *Attorney, Agent, or Firm* — Lee & Hayes, PLLC

(57) ABSTRACT

An intermediary device configured to insert at least one of user interest categories or a client device location in the header portion of a message received from a client device is described herein. The insertion enables a server receiving the message from the intermediary device to target content to the client device based on the at least one of the user interest categories or the client device location.

12 Claims, 5 Drawing Sheets

(56) References Cited

U.S. PATENT DOCUMENTS

| | | | |
|---|---|---|---|
| 2004/0092271 A1* | 5/2004 | Viikari et al. | 455/456.2 |
| 2004/0120323 A1* | 6/2004 | Viikari et al. | 370/395.5 |
| 2004/0127237 A1* | 7/2004 | Hurtta | 455/466 |
| 2004/0147265 A1* | 7/2004 | Kelley et al. | 455/445 |
| 2004/0215824 A1* | 10/2004 | Payrits | 709/245 |
| 2004/0242202 A1* | 12/2004 | Torvinen | 455/412.1 |
| 2004/0254838 A1* | 12/2004 | Guo et al. | 705/14 |
| 2004/0264474 A1* | 12/2004 | Sbida | 370/395.5 |
| 2004/0266453 A1* | 12/2004 | Maanoja et al. | 455/456.1 |
| 2005/0038876 A1 | 2/2005 | Chaudhuri | |
| 2005/0201343 A1* | 9/2005 | Sivalingham et al. | 370/338 |
| 2005/0215238 A1 | 9/2005 | Macaluso | |
| 2005/0256766 A1* | 11/2005 | Garcia et al. | 705/14 |
| 2006/0252438 A1* | 11/2006 | Ansamaa et al. | 455/503 |
| 2006/0264202 A1* | 11/2006 | Hagmeier et al. | 455/411 |
| 2007/0036118 A1* | 2/2007 | Shaffer et al. | 370/338 |
| 2007/0052533 A1* | 3/2007 | Glazer | 340/539.11 |
| 2007/0078714 A1* | 4/2007 | Ott et al. | 705/14 |
| 2007/0083663 A1* | 4/2007 | Tanabe et al. | 709/230 |
| 2007/0088851 A1* | 4/2007 | Levkovitz et al. | 709/246 |
| 2007/0113243 A1 | 5/2007 | Brey | |
| 2007/0165625 A1 | 7/2007 | Eisner et al. | |
| 2007/0174490 A1 | 7/2007 | Choi et al. | |
| 2007/0192294 A1 | 8/2007 | Ramer et al. | |
| 2007/0226051 A1* | 9/2007 | Addepalli et al. | 705/14 |
| 2008/0005313 A1* | 1/2008 | Flake et al. | 709/224 |
| 2008/0072139 A1 | 3/2008 | Salinas et al. | |
| 2008/0086525 A1 | 4/2008 | Angwin | |
| 2008/0134042 A1* | 6/2008 | Jankovich | 715/733 |
| 2008/0153520 A1 | 6/2008 | Kirtane | |
| 2008/0189360 A1 | 8/2008 | Kiley et al. | |
| 2008/0200161 A1* | 8/2008 | Morse et al. | 455/418 |
| 2008/0200186 A1* | 8/2008 | Vare et al. | 455/456.2 |
| 2008/0214149 A1 | 9/2008 | Ramer et al. | |
| 2008/0228537 A1* | 9/2008 | Monfried et al. | 705/7 |
| 2008/0244076 A1* | 10/2008 | Shah et al. | 709/227 |
| 2008/0248815 A1 | 10/2008 | Busch | |
| 2008/0255944 A1 | 10/2008 | Shah et al. | |
| 2008/0287096 A1* | 11/2008 | Aaltonen et al. | 455/406 |
| 2008/0300967 A1 | 12/2008 | Buckley et al. | |
| 2008/0311927 A1* | 12/2008 | Boman et al. | 455/456.1 |
| 2008/0318593 A1* | 12/2008 | Cao et al. | 455/456.1 |
| 2009/0005066 A1* | 1/2009 | Florkey et al. | 455/456.1 |
| 2009/0048914 A1 | 2/2009 | Shenfield et al. | |
| 2009/0049090 A1 | 2/2009 | Shenfield et al. | |
| 2009/0067420 A1* | 3/2009 | Ganesan et al. | 370/389 |
| 2009/0076917 A1 | 3/2009 | Jablokov et al. | |
| 2009/0085806 A1 | 4/2009 | Piersol et al. | |
| 2009/0099951 A1* | 4/2009 | Pandurangan | 705/37 |
| 2009/0138439 A1* | 5/2009 | Yeung et al. | 707/3 |
| 2009/0149199 A1 | 6/2009 | Maghoul | |
| 2009/0192866 A1 | 7/2009 | Karnam et al. | |
| 2009/0199268 A1 | 8/2009 | Ahmavaara et al. | |
| 2009/0203359 A1 | 8/2009 | Makhoul et al. | |
| 2009/0222329 A1* | 9/2009 | Ramer et al. | 705/10 |
| 2009/0240586 A1 | 9/2009 | Ramer et al. | |
| 2009/0248529 A1* | 10/2009 | Dhanapal et al. | 705/14.55 |
| 2009/0248680 A1 | 10/2009 | Kalavade | |
| 2009/0265245 A1 | 10/2009 | Wright | |
| 2009/0319187 A1 | 12/2009 | Deeming et al. | |
| 2009/0327488 A1* | 12/2009 | Sampat et al. | 709/224 |
| 2010/0022222 A1 | 1/2010 | Li | |
| 2010/0082780 A1 | 4/2010 | Muilenburg et al. | |
| 2010/0106562 A1 | 4/2010 | Taylor et al. | |
| 2010/0106596 A1 | 4/2010 | Grimes | |
| 2010/0121718 A1 | 5/2010 | AlanDietz | |
| 2010/0131584 A1 | 5/2010 | Johnson | |
| 2010/0311399 A1* | 12/2010 | Cusick et al. | 455/414.2 |
| 2011/0026064 A1* | 2/2011 | Kato et al. | 358/1.14 |
| 2011/0035284 A1* | 2/2011 | Moshfeghi | 705/14.58 |
| 2011/0167160 A1* | 7/2011 | Murakami et al. | 709/227 |
| 2011/0258049 A1* | 10/2011 | Ramer et al. | 705/14.66 |
| 2012/0042262 A1* | 2/2012 | Priyadarshan et al. | 715/745 |

* cited by examiner

INSERTION OF USER INFORMATION INTO HEADERS TO ENABLE TARGETED RESPONSES

BACKGROUND

The increase in distribution of media over the Internet has led to the desire for advertisers and other content providers to develop new ways of reaching potential consumers. Previously, an advertiser knew a general location of a person receiving the advertisement. For example, an advertiser in a geographically-based television market knew that the person viewing its add was in that television market. On the Internet, however, advertisers typically do not know the location of the person receiving the advertisements. Advertisers are able to take advantage of user activities monitored by servers, such as a history of search queries tracked by a search engine. These user activities may be used to formulate interests of consumers that are then used in determining appropriate advertisements. User activities, however, often depend on a current user location and are irrelevant when a user is no longer at that location. For example, if a user is visiting a certain town and searches for restaurants in that town, that search activity will be irrelevant to the user upon his or her departure and would thus be a poor determiner of which advertisements are appropriate.

Many user devices, such as telecommunication devices, have mechanisms for determining their locations. For example, many of these devices are equipped with Global Positioning System (GPS) components that enable a telecommunication device to locate itself. This location information is sometimes provided to remote servers, such as third party application servers. The downside of these mechanisms, however, is the amount of power and processing they consume. Typically, user devices have limited battery power and processing means that must be conserved. Thus, use of these user device-based location mechanisms for providing servers with user locations is problematic.

BRIEF DESCRIPTION OF THE DRAWINGS

The detailed description is set forth with reference to the accompanying figures, in which the left-most digit of a reference number identifies the figure in which the reference number first appears. The use of the same reference numbers in different figures indicates similar or identical items or features.

DETAILED DESCRIPTION

Figure 1:
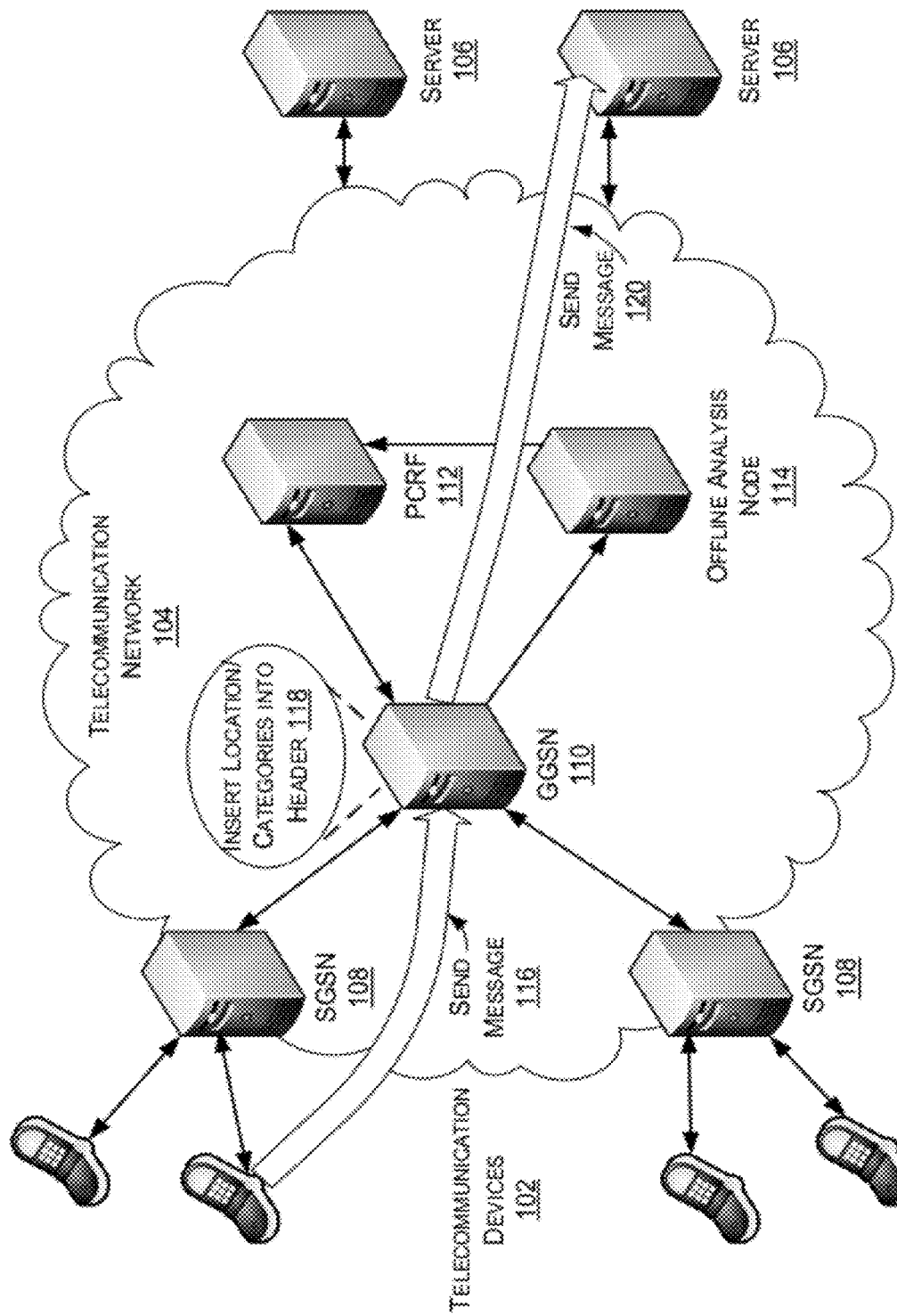
FIG. 1 illustrates an overview of an example telecommunication network which includes devices that insert user interest categories and locations into headers of messages sent from telecommunication devices to servers, in accordance with various embodiments.

Described herein are techniques for inserting at least one of a client device location or user interest categories in a header portion of a message transmitted from a client device to a server. The insertion is performed by an intermediary device, such as a gateway device, that transmits the message from the client device to the server. In some implementations, the client device is a telecommunication device and the intermediary device is a gateway support node, such as a Gateway GPRS Support Node (GGSN), of a telecommunication network. As used herein, "GPRS" stands for "General Packet Radio Service." The telecommunication network may provide telecommunication services to the client device.

In various implementations, the intermediary device gathers user activity data describing activities of the user of the client device, such as browsing network content. The intermediary device may also gather or receive data indicative of a client device's location, such as client device location coordinates. The intermediary device may then either use the user activity data to determine user interest categories or provide the user activity data to another device, such as an offline analysis node of the telecommunication network for the offline analysis node to determine the user interest categories. The intermediary device or the other device may then provide the user interest categories to another device, such as a Policy Control Rules Function node (PCRF) of the telecommunication network, for storage. Also, the intermediary device may provide the data indicative of the client device's location to the other device storing the user interest categories. The other device storing the user interest categories may also include location-coordinate-to-zip-code mappings which the other device may use to map the data indicative of the client device's location to a zip code.

Upon receiving a message from the client device destined for a server, such as a web server, the intermediary device may first communicate with another device (e.g., the PCRF) to retrieve at least one of user interest categories or a zip code. The other device may also provide policies and rules associated with a user of the client device. In some implementations, the intermediary device performs the insertion conditionally based upon these policies and rules. If the other device does not provide any user interest categories, the intermediary device may determine such user interest categories based on the user activity data it has gathered. The intermediary device then inserts at least one of the client device location or user interest categories in a header portion of the message, such as an extended header of a Hypertext Transfer Protocol (HTTP) request message, and transmits the message to the server. Upon receipt, the server then determines targeted content, such as advertising, and provides the targeted content to the client device along with content requested by the client device in the message.

Further described herein is a computing device, such as the PCRF mentioned above, that is configured to receive and store user interest categories and to provide them to intermediary devices, such as the GGSN, upon request. The user interest categories may be received from one intermediary device, multiple intermediary devices, or another device (e.g., an offline analysis node). In some implementations, the computing device may receive user interest categories that were determined based user activity data gathered at multiple intermediary devices. Such user interest categories may be determined by providing to a second intermediary device first user interest categories that were determined based on user activity data gathered at a first intermediary device, the second intermediary device modifying the user interest categories based on user activity data that the second intermediary device has gathered. In further implementations, the computing device may store a set of user interest categories for each combination of a user and intermediary device or a user and a zip code. Additionally, the computing device may store policies and rules, such as those described above, and location-coordinate-to-zip-code mappings. Upon receiving location coordinates from an intermediary device (e.g., with a request for user categories), the computing device may determine a zip code based on the mappings and provide that zip code to the intermediary device.

Overview

FIG. 1 illustrates an example telecommunication network which includes devices that insert user interest categories and locations into headers of messages sent from telecommunication devices to servers, in accordance with various embodiments. As shown in FIG. 1, one or more telecommunication devices 102 may communicate through a telecommunication network 104 with one or more servers 106. Each telecommunication device 102 may connect to the telecommunication network 104 through a Serving GPRS Support Node (SGSN) 108. The SGSNs 108 in turn communicate with one or more Gateway GPRS Support Nodes (GGSN) 110 of the telecommunication network 104. Messages flowing from the telecommunication devices 102 may be received by an SGSN 108, transmitted from the SGSN 108 to the GGSN 110, and transmitted from the GGSN 110 across the telecommunication network to the servers 106. In handling messages and interactions with a telecommunication device 102, the GGSN 110 communicates with a Policy Control Rules Function node (PCRF) 112 that provides rules and policies associated with a user of that telecommunication device 102. The GGSN 110 may also communicate with an offline analysis node 114 to provide the offline analysis node with user activity data gathered by the GGSN 110.

As further shown in FIG. 1, a telecommunication device 102 may transmit 116 a message destined for a server 106. The GGSN 110, in receipt of that message and acting as an intermediary node, may then insert 118 at least one of a telecommunication device location, such as a zip code, or user interest categories in a header portion of the message. The user interest categories may have been determined at least in part by the GGSN 110, another GGSN 110, the offline analysis node 114, or some combination thereof, and may have been received from the PCRF 112. The insertion 118 enables the server 106 to provide targeted content to the telecommunication device 102 based on at least one of the telecommunication device location or the user interest categories. The GGSN 110 then transmits 120 the message to the server 106.

In various implementations, the telecommunication devices 102 may be any sort of telecommunication devices. For example, the telecommunication devices 102 may include cellular phones, personal digital assistants (PDA), media players, game devices, personal computers (PC) or laptop computers. An example device capable of implementing a telecommunication device 102 is illustrated in greater detail in FIG. 5 and is described in detail below with reference to that figure.

As shown in FIG. 1, the telecommunication devices 102 may communicate with a telecommunication network 104. The telecommunication devices 102 may receive telecommunication services from a telecommunication service provider associated with the telecommunication network 104. Such telecommunication services may include voice, messaging, and data services enabling users of the telecommunication devices 102 to place and receive voice calls, send and receive text messages, and browse network content. In some implementations, these telecommunication services enable the telecommunication devices 102 to communicate with servers 106, acting as client devices of those servers 106. The telecommunication devices 102 may request content from the servers 106 and receive that content in answer to the requests. The telecommunication devices 102 may also receive other content provided by the servers 106, such as targeted content including advertisements. The received content can then be displayed by the telecommunication devices 102 to users of the telecommunication devices 102.

Also, in some implementations, the telecommunication devices 102 are each associated with a user's subscription to telecommunication services. In one implementation, multiple telecommunication devices 102 may be associated with the same subscription. Additionally, the telecommunication devices 102 may also travel with their users and thus be used at a plurality of different geographic locations.

In various implementations, the telecommunication network 104 may comprise any one or more networks known in the art, such as cellular networks and/or data networks, including wide area networks (WANs), local area networks (LANs), personal area networks (PANs), and/or the Internet. As mentioned above, the telecommunication network 104 may be a network of a telecommunication service provider. Such a network may be a public or private network or may include a combination of both public and private networks. A connection between the telecommunication devices 102 and the telecommunication network 104 may be through a number of routers, base stations, and/or devices acting as bridges between cellular and data networks. In addition to the SGSNs 108, the GGSNs 110, the PCRF 112, and the offline analysis node, the telecommunication network 104 may also include a number of other devices, such as a home location register (HLR) or a mobile switching center.

Communications between the devices of the telecommunication network 104 utilize any sort of communication protocol known in the art for sending and receiving messages, such as Transmission Control Protocol/Internet Protocol (TCP/IP), HTTP, and/or Session Initiation Protocol (SIP). The devices of the telecommunication network 104 are also connected to each other via wired and/or wireless connections, such as through Ethernet and Wi-Fi connections. Also, telecommunication network 104 may be associated with a single geographic location or with a number of dispersed geographic locations. Because the devices of the telecommunication network 104 may be remote from each other geographically, communications between the devices may be secured by VPNs and network tunnels (not shown) or by point-to-point connections.

In various embodiments, each server 106 may be implemented in any sort of computer system, such as a personal computer (PC), a laptop computer, a workstation, a server system, a mainframe, or a server farm. The servers 106 may be servers included in the telecommunication network 104 selling applications or services related to the telecommunication services provided to the telecommunication devices 102 or may be publicly-available servers accessed, for instance, over the Internet. The servers 102 could include web servers of search engines or ecommerce sites, or could be any sort of provider of content. In response to receiving HTTP requests such as requests for web pages or search queries, the servers 106 may transmit web pages or other content to requesting client devices. In some implementations, upon receiving HTTP request messages, the servers 106 check an HTTP header or extended header of the message to determine whether additional information about the user, such as the user's location or user interest categories, is present. If such information is present, the servers 106 may modify the content that they provide to the client devices or may provide additional content. For example, if a server 106 is a search engine, the server 106 may re-rank search results based on the information found in the header, may provide targeted advertisements along with the search results, or may do both of these actions. An example device capable of implementing a server 106 is illustrated in greater detail in FIG. 5 and is described in detail below with reference to that figure.

In some implementations, there may be an agreement between an entity associated with the servers 106 and the telecommunication service provider to receive the information about users of client devices in message headers. The agreement may enable the servers 106 to receive such information in headers in exchange, for example, for payment of fees to the telecommunication service provider. In one implementation, the servers 106 will only receive such information in message headers if there is an agreement in place.

As further illustrated in FIG. 1, the telecommunication devices 102 may connect to a plurality of SGSNs 108 of the telecommunication network 104. Each SGSN 108 each server 106 may be implemented in any sort of computer system, such as a personal computer (PC), a laptop computer, a workstation, a server system, a mainframe, or a server farm. Each SGSN 108 may connect to a plurality of telecommunication devices 102. In alternate implementations, the telecommunication network 104 may comprise a single SGSN 108. In some implementations, an SGSN 108 may be associated with a geographic area and may be responsible for delivering network traffic to and from telecommunication devices 102 in its geographic area. Functionalities of the SGSNs 108 may include packet routing and transfer, mobility management, logical link management, and authentication and charging functions. Each SGSN 108 may be associated with a location register as well that stores location information (e.g., the cell that the SGSN 108 belongs to) and user profiles of users registered with the SGSN 108. The SGSNs 108 may further be in communication with base stations of the telecommunication network 108 or other access points, receiving telecommunication device traffic through the base stations/access points. Also, as shown in FIG. 1, the SGSNs 108 may communicate with the GGSN 110. In some embodiments, the communication may be through a network tunnel between one of the SGSNs 108 and the GGSN 110, the network tunnel securing the communications between those devices. An example device capable of implementing the SGSN 108 is illustrated in greater detail in FIG. 5 and is described in detail below with reference to that figure.

In various implementations, the GGSN 110 may be implemented in any sort of computer system, such as a personal computer (PC), a laptop computer, a workstation, a server system, a mainframe, or a server farm. While the telecommunication network 104 is only shown as including a single GGSN 110, it may include multiple GGSNs 110 associated, for instance, with multiple geographic areas or locations. An example device capable of implementing the GGSN 110 is illustrated in greater detail in FIG. 5 and is described in detail below with reference to that figure.

As mentioned above, the GGSN 110 communicates with the SGSNs 108, receiving messages and other traffic destined for servers 106 and other devices that was received by the SGSNs 108 from the telecommunication devices 102. In some implementations, the GGSN 110 is responsible for internetworking between a GPRS network of the telecommunication network 110 and one or more packet-switched networks, such as a packet-switched network of the telecommunication network 104, the Internet, or both. From the perspective of packet-switched networks communicating with the GGSN 110, the GGSN 110 appears to be a router to a sub-network. Also, the GGSN 110 converts GPRS packets received over the GPRS network from the SGSN 108 into a packet data protocol (PDP), and converts packets received in PDPs into GPRS packets.

In some implementations, the GGSN 110 receives a PDP context message from a telecommunication device 102 transmitted through a SGSN 108. The PDP context message may be transmitted when a user first activates the telecommunication device 102, when the telecommunication device 102 first connects to a base station or access point, or when a user first engages in a specific activity, such as network browsing. Upon receiving a PDP context message, a packet data connection is established between the telecommunication device 102 and the GGSN 110, and the GGSN 110 sends a credit control request (CCR) to the PCRF 112 of the telecommunication network 104. In return, the GGSN 110 may receive a credit control answer (CCA) from the PCRF 112, the PCRF 112 specifying rules and policies associated with the subscription plan of the user of the telecommunication device 102. The GGSN 110 may then manage network traffic from the telecommunication device 102 based on those rules and policies.

In various implementations, the GGSN 110 also determines if the CCA includes any user interest categories for the GGSN 110 to insert into subsequent messages from the telecommunication device 102 to servers 106. The user interest categories may be any sort of classifiers of user interests evidenced, for example, from user activities. For example, if a user browses websites for three different restaurants, "restaurant" may be included in the user interest categories. Also, the user interest categories may be only Top-N categories, such as a top 3 categories, the ranking of the categories also determines based at least in part on user activity data.

In some implementations, the GGSN 110 then monitors user activity data. The monitoring may be performed regardless of whether the CCA included user interest categories or performed only if the CCA did not include user interest categories. Because traffic between the telecommunication device 102 and servers 106 flows through the GGSN 110, the GGSN 110 is able to monitor and capture all network traffic. Such traffic may include booth browsing of network content and, in some implementations, traffic with a dedicated application server of a provider of a telecommunication device application. The GGSN 110 logs the monitored user activity data in some form of storage, such as a file or database that may be stored locally or remotely.

The GGSN 110 then utilizes the user activity data to determine user interest categories or provides the user activity data to an offline analysis node 114. If the CCA included user interest categories, the GGSN 110 may refrain from determining new or updated user interest categories based on the user activity data. Or, in other implementations, the GGSN 110 may determine updated user interest categories based on the user interest categories received in the CCA and on the monitored user activity data. In determining new or updated user interest categories, the GGSN 110 may utilize a rules bases having rules and categories and may apply the rules base to the user activity data and, if available, previous user interest categories. Different rules bases with differing degrees of particularity may be used based on available processing and power considerations. In some implementations, to allow for a more fine-grained analysis of the user activity data and previous user interest categories, the data and categories may be provided by the GGSN 110 to an offline analysis node. In implementations where the GGSN 110 determines the user interest categories, the GGSN 110 may then provide the user interest categories to the PCRF 110 for storage.

In various implementations, the GGSN 110 also receives or gathers telecommunication device location information, such as location coordinates. The GGSN 110 may receive or gather the location information in a number of ways. For instance, the GGSN 110 may receive the location information in the PDP context message, in another message from the telecommunication device 102, or by intercepting global positioning system (GPS) coordinates provided to the telecommunication device 102. The GGSN 110 may intercept such GPS coordinates while monitoring the user activity data. The GGSN 110 may also gather location information by requesting such information from a base station, access point, or SGSN 108. In one implementation, rather than using location coordinates of the telecommunication device 102, the GGSN 110 may gather a location of a base station, access point, or SGSN 108 associated with the telecommunication device 102 and may use that gather location as the location information of the telecommunication device 102.

In some implementations, the GGSN 110 provides the gathered/received telecommunication device location information to the PCRF 110 in the CCR. The PCRF 112 may then return another sort of location identifier, such as a zip code that is associated with the telecommunication device location information, in the CCA. A zip code or other location identifier may be more meaningful to a server 106 than the telecommunication device location information.

In various implementations, the GGSN 110 may receive a message from the telecommunication device 102, as shown by arrow 116 in FIG. 1. While the message is shown as being transmitted directly from the telecommunication device 102 to the GGSN 110, the message may be transmitted through any number of intermediate devices, such as SGSN 108. The message received may be an HTTP request message which may, in some implementations, be encapsulated in a GPRS packet for transfer from the telecommunication device 102 to the GGSN 110.

Figure 2:
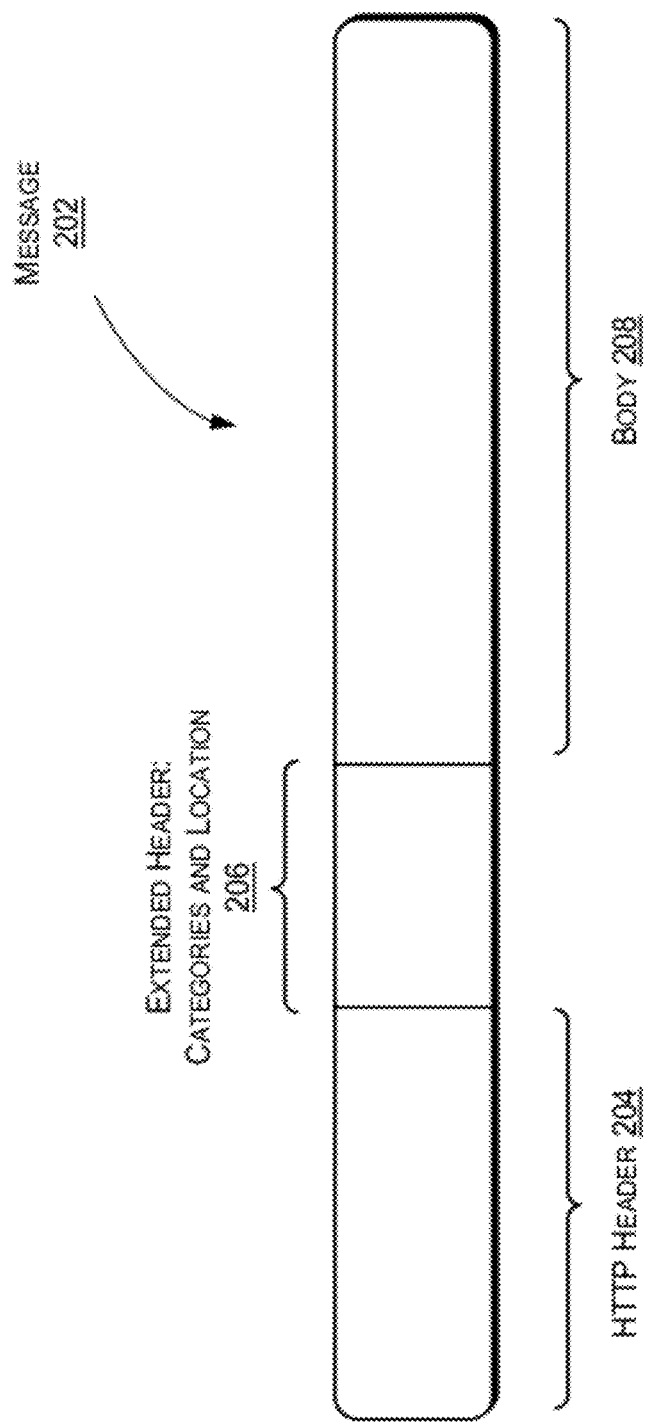
FIG. 2 illustrates an example message including a header portion, in accordance with various embodiments.

Such as the HTTP request message 202 is shown in FIG. 2. As illustrated in FIG. 2, the message 202 includes an HTTP header portion 204, an extended header portion 206, and a message body 208. The contents of the HTTP header portion 204 may be defined by HTTP and include such information as sender and destination IP addresses. The body 208 may include any sort of content or instructions or may even be a random combination of bits. The extended header portion 206 may be a header utilized by the telecommunication network 104 to communicate additional parameters to message recipients, such as at least one of a location identifier or user interest categories. The fields of the extended header portion 206 may each include a label, such as location or categories, followed by data associated with the label, such as a location identifier or user interest categories. In other implementations, the message 202 includes a single HTTP header portion 204 and no extended header portion 206, and one or more fields of the HTTP header portion 204 may be used to store at least one of the location identifier or user interest categories.

Referring again to FIG. 1, once the GGSN 110 receives the message from the telecommunication device 102, it may first translate the message, if necessary. For example, if the message is an HTTP request encapsulated in a GPRS packet, the GGSN 110 may remove the GPRS packet encapsulation, leaving an HTTP request message capable of being transmitted across a PDP network. The GGSN 110 then checks the rules or policies received from the PCRF 112 to determine whether the server 106 that the message is destined to is associated with an entity that has an agreement with the telecommunication service provider. If there is such an agreement, the rules or policies will indicate that the GGSN 110 should insert at least one of the location identifier or user interest categories in a header portion of the message. If there is no agreement, the rules or policies may indicate this as well, and no insertion will take place. In other embodiments, the GGSN 110 may insert the at least one of the location identifier or the user interest categories regardless of any rules or policies.

The inserting is shown in element 118 of FIG. 1. In various implementations, the inserting involves the GGSN 118 modifying a header portion of the message, such as the extended header portion 206 or HTTP header portion 204 shown in FIG. 2, to include at least one of the location identifier (e.g., zip code) or the user interest categories. Upon inserting the at least one of the location identifier or user interest categories, the GGSN 110 transmits the message to the server 106, as shown by arrow 120 in FIG. 1. While the message is shown as being transmitted directly from the GGSN 110 to the server 106, the message may be transmitted through any number of intermediate devices. The server 106 that the message is transmitted to may be identified as the destination in a header portion of the message.

In some implementations, the GGSN 110 may also transmit messages from the server 106 to the telecommunication device 102, such as HTTP answer messages. Such answer messages may include requested content such as web pages and targeted content such as advertisements.

In various implementations, the PCRF 112 may be implemented in any sort of computer system, such as a personal computer (PC), a laptop computer, a workstation, a server system, a mainframe, or a server farm. While the telecommunication network 104 is only shown as including a single PCRF 112, it may include multiple PCRFs 112 that store the same rules or policies in a redundant fashion or in the manner of a storage area network. For the purposes of discussion, however, only a single PCRF 112 will be described. An example device capable of implementing the PCRF 112 is illustrated in greater detail in FIG. 5 and is described in detail below with reference to that figure.

As described above, PCRF 112 is capable of storing rules and policies associated with subscription plans of users of telecommunication devices 102, location-coordinate-to-zip-code mappings, and user interest categories. PCRF 112 may store this information in a file or database or in any sort of structure. The file, database, or structure may be local or remote.

In some implementations, the PCRF 112 receives one or both of the user interest categories or location identifiers in the CCR from the GGSN 110. Upon receiving the location identifiers, the PCRF 112 may look up the location identifiers in the mappings and determine a location such as a zip code, a city and state, or an address that can be utilized by the servers 106. The PCRF 112 may then return the location in the CCA to the GGSN 110.

In other implementations, the PCRF 112 receives the user interest categories from the offline analysis node 114.

Upon receiving the user interest categories from the GGSN 110 or the offline analysis node 114, the PCRF 112 may do one of a number of things. First, the PCRF 112 may replace any user interest categories currently associated with a subscription plan of a user of a telecommunication device 102 with the received user interest categories. These received user interest categories will be based at least partially on the replaced user interest categories, the replaced user interest categories having been previously provided to the GGSN 110, as described above. In one implementation, this allows user interest categories to be built from user activity data monitored at multiple GGSNs at multiple locations. For example, a first GGSN 110 may monitor user activity data, and either the first GGSN 110 or the offline analysis node 114 may determine user interest categories based on that user activity data. Those user interest categories are then stored by the PCRF 112 and provided to a second GGSN 110 at a second location when the telecommunication device 102 is used at that second location. The second GGSN 110 gathers user activity data and either determines updated user interest categories based on the previous user interest categories or provides the user activity data and previous user interest categories to the offline analysis node 114. The new user interest categories, now based on user activity data gathered by multiple GGSNs 110 at multiple locations, may then be stored by the PCRF 112.

In other implementations, the PCRF 112 may instead determine whether the received user interest categories are associated with a different GGSN 110 or different zip code than the user interest categories currently stored by the PCRF 112. If the received user interest categories are associated with a same GGSN 110 or zip code as those currently stored, then PCRF 112 may replace the previous categories with the newly received categories, as described above. If the received user interest categories are not associated with a same GGSN 110 or zip code as those currently stored, the PCRF 112 may store the received user interest categories as well without replacing those previously stored. In this manner, the PCRF 112 may maintain a set of user interest categories for each GGSN 110 or each zip code.

In various implementations, the PCRF 112 provides the user interest categories to the GGSN 110 in the CCA along with the location. If multiple sets of user interest categories are associated with the subscription plan of the user of the telecommunication device 102 that is associated with the CCR, the PCRF 112 selects the user interest categories to include in the CCA based on a zip code or GGSN 110.

In various implementations, the offline analysis node 114 may be implemented in any sort of computer system, such as a personal computer (PC), a laptop computer, a workstation, a server system, a mainframe, or a server farm. While the telecommunication network 104 is only shown as including a single offline analysis node 114, it may include multiple offline analysis nodes 114. For the purposes of discussion, however, only a single offline analysis node 114 will be described. An example device capable of implementing the offline analysis node 114 is illustrated in greater detail in FIG. 5 and is described in detail below with reference to that figure.

As described above, the offline analysis node 114 receives user activity data and, if available, previous user interest categories from the GGSN 110. Upon receiving the user activity data and user interest categories, the offline analysis node 114 determines user interest categories. In determining new or updated user interest categories, the offline analysis node 114 may utilize a rules base having rules and categories and may apply the rules base to the user activity data and, if available, previous user interest categories. Different rules bases with differing degrees of particularity may be used based on available processing and power considerations. In some implementations, as mentioned above, the offline analysis node 114 is a dedicated node capable of provided a more fine-grained determination of user interest categories than the GGSN 110. Upon determining the user interest categories, the offline analysis node 114 provides the user interest categories to the PCRF 112 for storage.

Example Interactions

Figure 3:
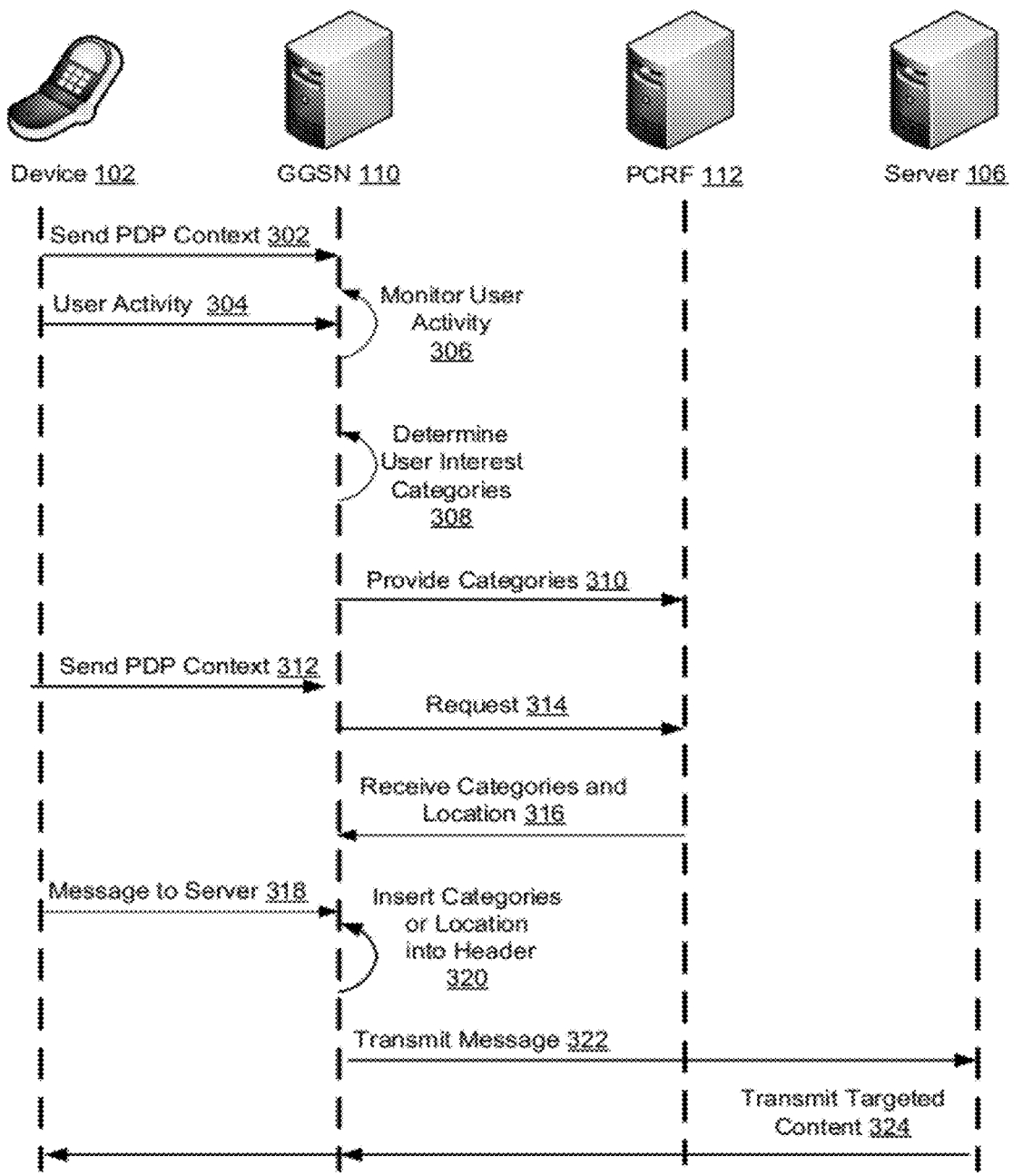
FIG. 3 illustrates an interaction diagram of a GGSN configured to determine user interest categories and to insert those categories in headers of messages sent from telecommunication devices to servers, in accordance with various embodiments.

FIG. 3 illustrates an interaction diagram of a GGSN configured to determine user interest categories and to insert those categories in headers of messages sent from telecommunication devices to servers, in accordance with various embodiments. The figure includes representations of the telecommunication device 102, a server 106, the GGSN 110, and the PCRF 112, each representation including a graphic depiction and a vertical line descending across the figure. Between these vertical lines are horizontal lines terminating in arrows representing interactions between ones of the telecommunication device 102, a server 106, the GGSN 110, and the PCRF 112. Each horizontal line represents a single interaction or a group of interactions. When one of the horizontal lines crosses a vertical line without terminating at an arrow, this indicates that the system associated with the crossed line is not involved in the interaction. When one of the horizontal lines crosses a vertical line, terminates at an arrow, and then resumes, this indicates that the system associated with the crossed line is involved in the interaction. For example, if a horizontal line extends between a first vertical line and a third vertical line, crosses a second vertical line, and terminates with arrows at each of the second and third vertical lines, this indicates that devices associated with each of the first, second, and third vertical lines are involved in the interaction.

As illustrated, a telecommunication device 102 may send 302 a PDP context message to the GGSN 110 to initiate a data connection between the telecommunication device 102 and the GGSN 110. Such a message may be transmitted through a SGSN 108 and may be transmitted in response to a user turning on the telecommunication device 102 or in response to a user engaging in browsing activity on the telecommunication device 102.

Next, the user of the telecommunication device 102 engages in some activity, such as browsing network content. This activity involves sending messages 304 associated with the user activity to or through the GGSN 110, the GGSN 110 monitoring 306 the user activity data. Also, the GGSN 110 may previously or concurrently transmit a CCR to the PCRF 112, as discussed above.

Based on the monitored user activity data, the GGSN 110 determines 308 user interest categories associated with the user of the telecommunication device 102. As mentioned above, this determining 308 may be performed based at least in part on a rules base and also, if available, on previous user interest categories received from the PCRF 112 in a CCA. The GGSN 110 then provides 310 the user interest categories to the PCRF 112 for storage.

As further shown in FIG. 3 the telecommunication device 102 may again send 312 a PDP context message to the GGSN 110 to initiate a data connection between the telecommunication device 102 and the GGSN 110. The telecommunication device 102 may perform the sending 312 after the termination of a previous data connection between the telecommunication device 102 and the GGSN 110. In one implementation, the GGSN 110 that the PDP context message is sent 312 to may be a different GGSN 110 than the GGSN 110 that the telecommunication device 102 was previously connected to. For example, the GGSN 110 may be a GGSN associated with a different location.

Upon receiving the PDP context message, the GGSN 110 sends 314 a CCR to the PCRF 112. As mentioned above, the GGSN 110 may include in the CCR location information associated with the telecommunication device 102, such as location coordinates. The receiving or gathering of the location information is also described above.

The GGSN 110 then receives 316 a CCA in response that includes user interest categories stored by the PCRF 112, a location identifier such as a zip code, and rules or policies associated with a user of the telecommunication device 102. As mentioned above, the PCRF 112 determines the location identifier based on the location information provided in the CCR and on mappings stored by the PCRF 112.

In various implementations, the GGSN 110 then receives 318 a message from the telecommunications device 102, such as an HTTP request message destined for a server 106. Upon receiving 318 the message, the GGSN 110 inserts 320 at least one of user interest categories or the location identifier in a header portion of the HTTP request message, such as an extended header portion of the message. In one implementation, the GGSN 110 performs the inserting conditionally based upon the rules or policies provided in the CCA.

The GGSN 110 then transmits 322 the message to the server 106 to which the message was addressed. The server 106 may then determine targeted content to include with the content requested from the server 106 or may modify the requested content. The determining or modifying may be performed by the server 106 based on at least one of the user interest categories or location identifier found in the message. The server 106 may then transmit 324, in response, the request content and targeted content or the modified requested content. The transmission 324 may be through the GGSN 110, as shown in FIG. 3.

Figure 4:
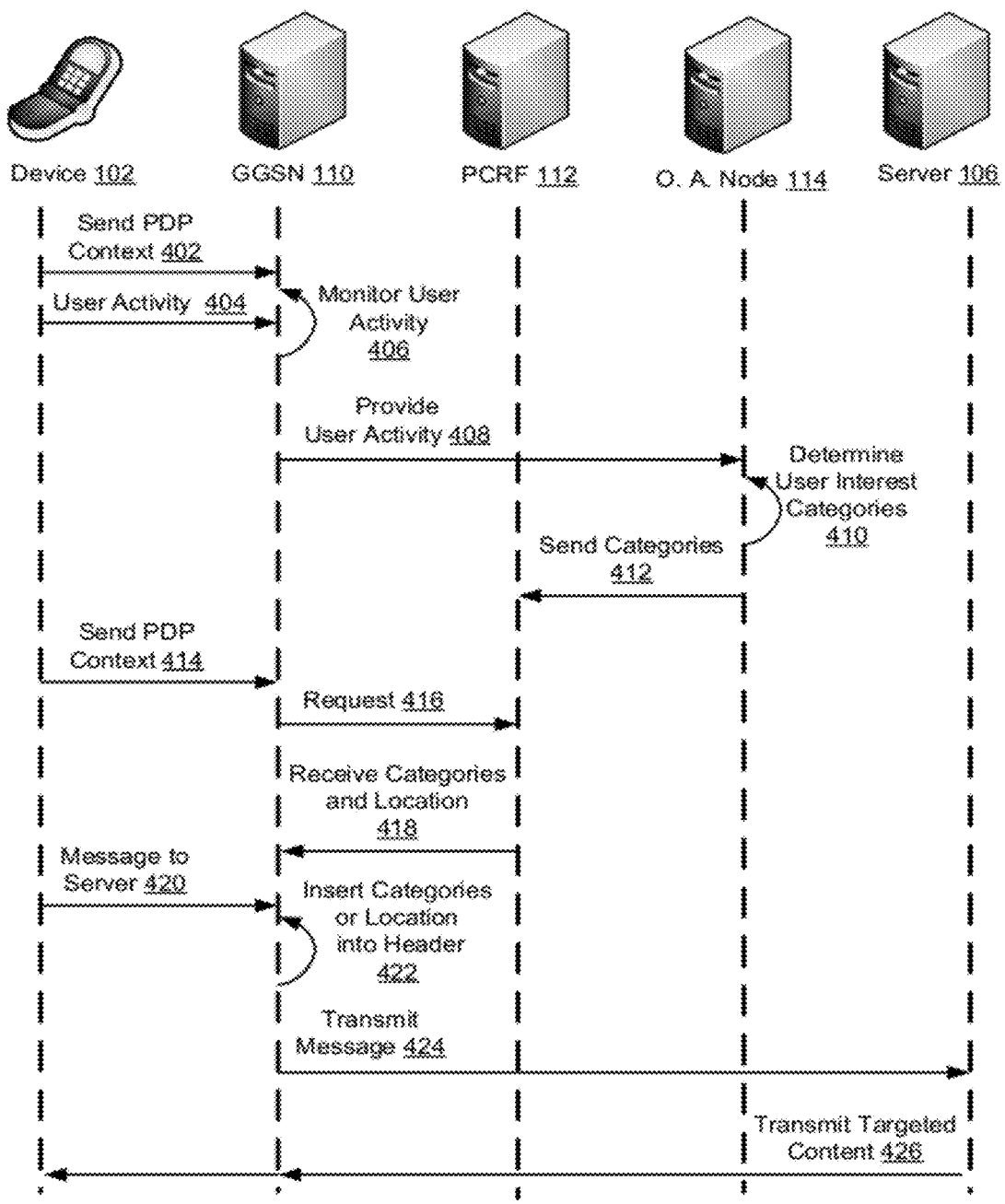
FIG. 4 illustrates an interaction diagram of a GGSN configured to provide user activity data to an offline analysis node which determines user interest categories, the GGSN inserting those categories in headers of messages sent from telecommunication devices to servers, in accordance with various embodiments.

FIG. 4 illustrates an interaction diagram of a GGSN configured to provide user activity data to an offline analysis node which determines user interest categories, the GGSN inserting those categories in headers of messages sent from telecommunication devices to servers, in accordance with various embodiments. The figure includes representations of the telecommunication device 102, a server 106, the GGSN 110, the PCRF 112, and the offline analysis node 114, each representation including a graphic depiction and a vertical line descending across the figure. Between these vertical lines are horizontal lines terminating in arrows representing interactions between ones of the telecommunication device 102, a server 106, the GGSN 110, the PCRF 112, and the offline analysis node 114. Each horizontal line represents a single interaction or a group of interactions. When one of the horizontal lines crosses a vertical line without terminating at an arrow, this indicates that the system associated with the crossed line is not involved in the interaction. When one of the horizontal lines crosses a vertical line, terminates at an arrow, and then resumes, this indicates that the system associated with the crossed line is involved in the interaction. For example, if a horizontal line extends between a first vertical line and a third vertical line, crosses a second vertical line, and terminates with arrows at each of the second and third vertical lines, this indicates that devices associated with each of the first, second, and third vertical lines are involved in the interaction.

As illustrated, a telecommunication device 102 may send 402 a PDP context message to the GGSN 110 to initiate a data connection between the telecommunication device 102 and the GGSN 110. Such a message may be transmitted through a SGSN 108 and may be transmitted in response to a user turning on the telecommunication device 102 or in response to a user engaging in browsing activity on the telecommunication device 102.

Next, the user of the telecommunication device 102 engages in some activity, such as browsing network content. This activity involves sending messages 404 associated with the user activity to or through the GGSN 110, the GGSN 110 monitoring 406 the user activity data. Also, the GGSN 110 may previously or concurrently transmit a CCR to the PCRF 112, as discussed above.

The GGSN 110 then provides 408 the user activity data and, if available, previous user interest categories to the offline analysis node 114. The offline analysis node 114 then determines 410 new or updated user interest categories based at least on a rules base, the user activity data, and, if available, previous user interest categories. Next, the offline analysis node sends 412 the determined user interest categories to the PCRF 112 for storage by the PCRF 112.

As further shown in FIG. 4 the telecommunication device 102 may again send 414 a PDP context message to the GGSN 110 to initiate a data connection between the telecommunication device 102 and the GGSN 110. The telecommunication device 102 may perform the sending 414 after the termination of a previous data connection between the telecommunication device 102 and the GGSN 110. In one implementation, the GGSN 110 that the PDP context message is sent 414 to may be a different GGSN 110 than the GGSN 110 that the telecommunication device 102 was previously connected to. For example, the GGSN 110 may be a GGSN associated with a different location.

Upon receiving the PDP context message, the GGSN 110 sends 416 a CCR to the PCRF 112. As mentioned above, the GGSN 110 may include in the CCR location information associated with the telecommunication device 102, such as location coordinates. The receiving or gathering of the location information is also described above.

The GGSN 110 then receives 418 a CCA in response that includes user interest categories stored by the PCRF 112, a location identifier such as a zip code, and rules or policies associated with a user of the telecommunication device 102. As mentioned above, the PCRF 112 determines the location identifier based on the location information provided in the CCR and on mappings stored by the PCRF 112.

In various implementations, the GGSN 110 then receives 420 a message from the telecommunications device 102, such as an HTTP request message destined for a server 106. Upon receiving 318 the message, the GGSN 110 inserts 422 at least one of user interest categories or the location identifier in a header portion of the HTTP request message, such as an extended header portion of the message. In one implementation, the GGSN 110 performs the inserting conditionally based upon the rules or policies provided in the CCA.

The GGSN 110 then transmits 424 the message to the server 106 to which the message was addressed. The server 106 may then determine targeted content to include with the content requested from the server 106 or may modify the requested content. The determining or modifying may be performed by the server 106 based on at least one of the user interest categories or location identifier found in the message. The server 106 may then transmit 426, in response, the request content and targeted content or the modified requested content. The transmission 426 may be through the GGSN 110, as shown in FIG. 4.

Example Systems

Figure 5:
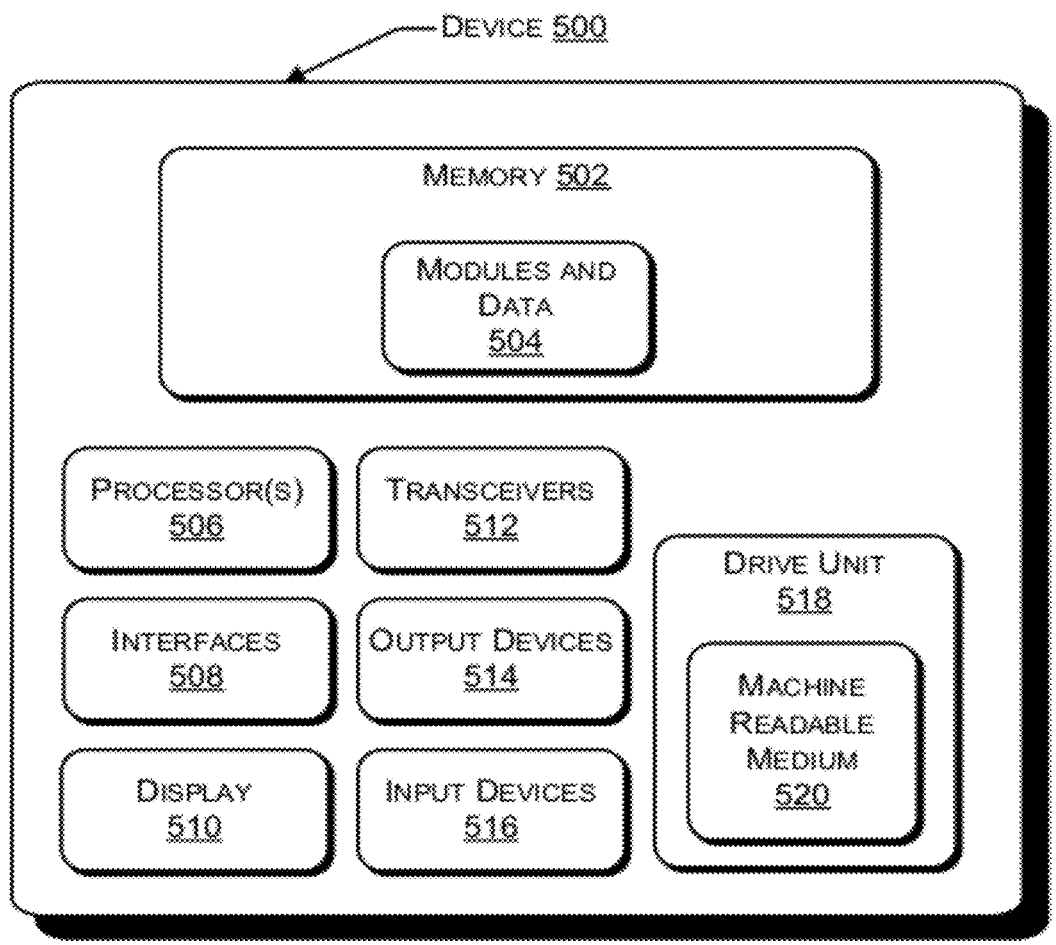
FIG. 5 illustrates a component level view of a computing device, in accordance with various embodiments.

FIG. 5 illustrates a component level view of an example device 502, in accordance with various embodiments. The device 500 may serve as a telecommunication device 102, a server 106, a SGSN 108, a GGSN 110, a PCRF 112, or an offline analysis node 114. As shown, the device 500 may include a memory 502, the memory storing modules and data 504. The device 500 further includes processor(s) 506, interfaces 508, a display 510, transceivers 512, output devices 514, input devices 516, and drive unit 518 including a machine readable medium 520.

In various embodiments, memory 502 generally includes both volatile memory and non-volatile memory (e.g., RAM, ROM, Flash Memory, miniature hard drive, memory card, or the like). Additionally, in some embodiments, when device 500 is a telecommunication device 102, memory 502 includes a SIM (subscriber identity module) card, which is a removable memory card used to identify a user of the device 500 to the telecommunication network 104.

The modules and data 504 may be any sort of executable instructions and data enabling the device 502 to perform one or more functions of one of the telecommunication devices 102, the servers 106, SGSN 108, GGSN 110, PCRF 112, or offline analysis node 114. The instructions may be organized into functions, classes, processes, threads, or applications. The data may be stored in any sort of data structure, such as a file or database.

In some embodiments, the processor(s) 506 is a central processing unit (CPU), a graphics processing unit (GPU), or both CPU and GPU, or other processing unit or component known in the art.

In various embodiments, the interfaces 508 are any sort of interfaces known in the art. Interfaces 508 include any one or more of an Ethernet interface, wireless LAN interface, a near field interface, a DECT chipset, or an interface for an RJ-11 or RJ-45 port. The a wireless LAN interface can include a Wi-Fi interface or a Wi-Max interface, or a Bluetooth interface that performs the function of transmitting and receiving wireless communications using, for example, the IEEE 802.11, 802.16 and/or 802.20 standards. The near field interface can include a Bluetooth® interface or RFID for transmitting and receiving near field radio communications via a near field antenna. For example, the near field interface may be used for functions, as is known in the art, such as communicating directly with nearby devices that are also, for instance, Bluetooth® or RFID enabled. A reader/interrogator may be incorporated into device 500.

In various embodiments, the display 510 is a liquid crystal display or any other type of commonly used display in telecommunication devices or other computing devices. For example, display 510 may be a touch-sensitive display screen, and can then also act as an input device or keypad, such as for providing a soft-key keyboard, navigation buttons, or the like.

In some embodiments, the transceivers 512 include any sort of transceivers known in the art. For example, transceivers 512 may include a radio transceiver and interface that performs the function of transmitting and receiving radio frequency communications via an antenna. The radio interface may facilitate wireless connectivity between the device 500 and various cell towers, base stations and/or access points.

In some embodiments, the output devices 514 include any sort of output devices known in the art, such as a display (already described as display 510), speakers, a vibrating mechanism, or a tactile feedback mechanism. Output devices 514 also include ports for one or more peripheral devices, such as headphones, peripheral speakers, or a peripheral display.

In various embodiments, input devices 516 include any sort of input devices known in the art. For example, input devices 516 may include a microphone, a keyboard/keypad, or a touch-sensitive display (such as the touch-sensitive display screen described above). A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like.

The machine readable medium 520 stores one or more sets of instructions (e.g., software) embodying any one or more of the methodologies or functions described herein. The instructions may also reside, completely or at least partially, within the memory 502 and within the processor 506 during execution thereof by the device 500. The memory 502 and the processor 506 also may constitute machine readable media 520.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

I claim:

1. A method comprising:
  receiving from a client device, by an intermediary device of a cellular network, a packet data protocol (PDP) context message to initiate a data connection and activate a PDP context on the intermediary device;
  receiving from the client device, by the intermediary device, a message destined for a server, the message including a header portion, wherein the header portion includes a header defined by a hypertext transfer protocol (HTTP) and an extended header;
  receiving, by the intermediary device, user interest categories from a policy control rules function (PCRF) node of the cellular network, wherein the PCRF node and the intermediary device are separate and distinct nodes of the cellular network;
  inserting, by the intermediary device, the user interest categories in the extended header, the insertion enabling the server to target content to the client device based on the user interest categories;
  receiving, by the intermediary device, location coordinates associated with the client device;
  providing, by the intermediary device, the location coordinates to another device;
  receiving, by the intermediary device, from the other device a zip code associated with the location coordinates, the intermediary device using the received zip code as the client device location;
  inserting the client device location in the extended header; and
  transmitting, by the intermediary device, the message to the server.

2. The method of claim 1, further comprising gathering user activity information associated with the client device, the user activity information including at least network browsing activity involving the client device.

3. The method of claim 2, further comprising updating the user interest categories based at least on the user activity and on a rules base.

4. The method of claim 3, further comprising providing the user interest categories to another device for storage.

5. The method of claim 2, further comprising providing the user activity information to the PCRF node to enable the PCRF node to determine the user interest categories based at least on the user activity information and on a rules base.

6. The method of claim 1, wherein the PCRF node stores one or more of the user interest categories, location-coordinate-to-zip-code mappings, or policies or rules associated with the client device.

7. The method of claim 6, further comprising performing the inserting based at least on the policies or rules associated with the client device, the policies or rules being set based on whether there is an agreement between a provider of the cellular network and an entity associated with the server regarding the inserting of user interest categories or client device locations.

8. The method of claim 1, wherein the client device is a telecommunication device and the intermediary device is a gateway general packet radio service (GPRS) support node (GGSN) of the cellular network, the cellular network being associated with a telecommunications service provider that provides telecommunication services to the client device.

9. The method of claim 1, wherein the server is a web server and the targeted content is advertising associated with content requested from the web server in the message.

10. A gateway device of a cellular network, comprising:
a processor;
a memory device coupled to the processor; and
a plurality of executable instructions stored on the memory device and configured to be operated by the processor to perform operations including:
receiving from a telecommunication device a packet data protocol (PDP) context message to initiate a data connection and activate a PDP context on the gateway device;
receiving, from a policy control rules function (PCRF) node of the cellular network, user interest categories associated with the telecommunication device, the user interest categories based at least in part on user activities observed by a plurality of gateway devices associated with a plurality of locations, wherein the PCRF node and the gateway device are separate and distinct nodes of the cellular network;
receiving, from the telecommunication device, a message destined for a server, the message including a header portion, wherein the header portion includes a header defined by a hypertext transfer protocol (HTTP) and an extended header,
inserting at least one of a telecommunication device location or the user interest categories in the extended header, the insertion enabling the server to target content to the telecommunication device based on the at least one of the telecommunication device location or the user interest categories, wherein the inserting is performed conditionally based on whether there is an agreement between a provider of the cellular network and an entity associated with the server regarding the inserting of user interest categories or telecommunication device locations, and
transmitting the message to the server.

11. The gateway device of claim 10, wherein the operations further include:
receiving location coordinates associated with the telecommunication device;
providing the location coordinates to the policy device; and
receiving from the policy device a zip code associated with the location coordinates, the gateway device using the received zip code as the telecommunication device location.

12. The gateway device of claim 10, wherein the server is a web server and the targeted content is advertising associated with content requested from the web server in the message.

* * * * *